(12) United States Patent
Greatbatch

(10) Patent No.: US 8,059,779 B2
(45) Date of Patent: Nov. 15, 2011

(54) $^3$HE FUSION DEVICE WITH DIRECT ELECTRICAL CONVERSION

(76) Inventor: Wilson Greatbatch, Akron, NY (US)

(*) Notice: Subject to any disclaimer, the term of this patent is extended or adjusted under 35 U.S.C. 154(b) by 1305 days.

(21) Appl. No.: 10/998,188

(22) Filed: Nov. 27, 2004

(65) Prior Publication Data

US 2005/0220243 A1    Oct. 6, 2005

Related U.S. Application Data (62) Division of application No. 10/150,894, filed on May 17, 2002, now abandoned.

(60) Provisional application No. 60/292,109, filed on May 18, 2001.

(51) Int. Cl.
*G21B 1/02* (2006.01)

(52) U.S. Cl. .......................... 376/147; 376/107; 376/113

(58) Field of Classification Search .................. 376/107, 376/113, 147; *G21B 1/00, 1/02*
See application file for complete search history.

(56) References Cited

U.S. PATENT DOCUMENTS

| | | | |
|---|---|---|---|
| 3,258,402 A | 6/1966 | Farnsworth | 176/1 |
| 3,386,883 A | 6/1968 | Farnsworth | 176/1 |
| 3,530,036 A | 9/1970 | Hirsch | 176/1 |
| 3,530,497 A | 9/1970 | Hirsch et al. | 176/1 |
| 3,533,910 A | 10/1970 | Hirsch | 176/1 |
| 3,655,508 A | 4/1972 | Hirsch | 176/5 |
| 3,664,920 A | 5/1972 | Hirsch | 376/107 |
| 3,668,065 A | 6/1972 | Moir | 376/147 |
| 3,816,771 A * | 6/1974 | Moir | 310/308 |
| 4,007,392 A | 2/1977 | Valfells et al. | 313/154 |
| 4,233,537 A | 11/1980 | Limpaecher | 313/231.3 |
| 4,446,096 A | 5/1984 | Auchterlonie | 376/145 |
| 4,735,762 A | 4/1988 | Lasche | 376/102 |
| 4,826,646 A | 5/1989 | Bussard | 376/129 |
| 5,160,694 A | 11/1992 | Steudtner | 376/107 |
| 5,160,695 A | 11/1992 | Bussard | 376/107 |
| 5,289,509 A | 2/1994 | Moeller | 376/123 |

(Continued)

FOREIGN PATENT DOCUMENTS

RU    1823761 A3 *  11/1996

OTHER PUBLICATIONS

L. A. Artsimovich, "Controlled Thermonuclear Reactions", Gordon & Breach Science Publishers, New York (1964), pp. 8-9.*

(Continued)

*Primary Examiner* — Johannes P Mondt
(74) *Attorney, Agent, or Firm* — Walter W. Duft (57) ABSTRACT

An improved $^3$He nuclear reactor with provision for direct electric conversion of a relativistic proton stream into useable electric power at a voltage level compatible with the national power grid (one million V DC). Various embodiments include multiple collector cages for extracting relativistic protons of various energy levels, diverter wires for deflecting high-energy proton streams to either side of lower energy cages to avoid unwanted impact. Other embodiments include arrangements for dividing multi-megavolt voltages down to a useable one megavolt level compatible with the national power grid. Further embodiments comprise guiding the proton stream by the cusps of magnetron cavities to permit conversion of the relativistic proton energies into microwave power. A proposal is also made for harvesting $^3$He from the Moon to supply earth-bound and space-bound reactors. A solution to the problem of charging a potential well-forming anode in an electrostatic fusion reactor without electrical arcing is further disclosed.

9 Claims, 4 Drawing Sheets

U.S. PATENT DOCUMENTS

| | | | | | |
|---|---|---|---|---|---|
| 5,365,070 | A | * | 11/1994 | Anderson et al. | 250/423 R |
| 5,734,122 | A | | 3/1998 | Aspden | 376/100 |
| 5,818,891 | A | | 10/1998 | Rayburn et al. | 376/107 |
| 6,121,569 | A | * | 9/2000 | Miley et al. | 219/121.48 |
| 2002/0186195 | A1 | * | 12/2002 | Janssen et al. | 345/100 |

OTHER PUBLICATIONS

J.D. Lawson, "Some Criteria for a Power Producing Thermonuclear Reactor", Proc. Phys. Soc. B70, p. 6-10 (1957).*

R.L. Burton et al, "Fusion Ship II—A Fast Manned Interplanetary Space Vehicle Using Inertial Electrostatic Fusion", Paper CP654, Space Techn. & Appls. Forum—STAIF 2003.*

T.H. Rider, "A general critique of inertial-electrostatic confinement fusion systems", Physics of Plasmas 2 (6), 1853-1872 (1995).*

D. Bohm, "Quantum Theory", Dover Publications, 1951), p. 280.*

Najmabadi et al, "The Aries Tokamak Fusion Reactor Study", Proc., Thirteenth IEEE Symposium on Fusion Engineering, Oct. 2-6, 1989, Knoxville, TN (USA).*

Ho et al, "A systems modulke for environmental and safety assessment in reactor studies—illustrative results for HT-9 structures", Fifteenth IEEE Symp. on Fusion Engineering, Hyannis, MA (Oct. 11-15, 1993).*

Academic Press Dictionary of Science and Technology, through XREFERPLUS, Copyright 1992, 1996, Academic Press: on "Fusion Reactor".*

Translation from Russian into English of Sapohznikov, SU 1823761, provided by the U.S. P.T.O. Translations Branch,S. Spar.*

Rostoker, Norman et al., "Colliding Beam Fusion Reactor," Nov. 1997, Science, vol. 278, p. 1421.

Rider, Todd H., "Fundamental limitation on plasma fusion systems not in thermodynamic equilibrium," Apr. 1997, American Inst. of Physics, Phys. Plasmas 4 (4), p. 1045.

Smith, B.H. et al., "An Engineering Study of the Electrical Design of a 1000-Megawatt Direct Converter for Mirror Reactors," Apr. 1974, USAEC, CONF-72111, p. 611.

Carlson, G.A. et al., "Mirror Machine Reactors," Sep. 1976, Lawrence Livermore Laboratory, UCRL-78148, pp. 1-18.

Robert W. Bussard, "Fusion as Electric Propulsion," Sep.-Oct. 1990, Pacific-Sierra Research Corp., vol. 6.

G.H. Miley, A D-3He IEC Power Unit for Space Application, 1999, Space Technology and Applications International Forum CP458, 6 pages.

Robert W. Bussard et al., System/Subsystem Interface Considerations and R & D Requirements for IEF/QED Engine Systems, 1998, Space Technology and Applications International Forum, pp. 1344-1351.

William L. Barr et al., "Test Results on Plasma Direct Converters," Jan. 1983, Nuclear Technology/Fusion, pp. 98-111.

W.L. Barr et al., "Experimental and Computational Results on Direct Energy Conversion for Mirror Fusion Reactors," 1977, Nuclear Fusion 17 5, pp. 1015-1022.

R.W. Moir et al., "'Venetian-Blind' Direct Energy Converter for Fusion Reactors," 1973,Nuclear Fusion 13, pp. 35-45.

G.L. Kulcinski et al., Nuclear Power Without Radioactive Waste—The Promise of Lunar Helium-3, 2000, Fusion Technology Institute, 7 pages.

G.L. Kulcinski et al., "Demonstration of D3He Fusion in an Inertial Electrostatic Confinement Device—Progress Report Jan. 29, 1999 through Dec. 28, 1999," Dec. 28, 1999, Fusion Technology Institute of University of Wisconsin-Madison, 21 pages.

G.L. Kulcinski et al., "Demonstration of D3He Fusion in an Inertial Electrostatic Confinement Device—Progress Report Jan. 29, 1998 through Jan. 28, 1999," Jan. 29, 1999, Fusion Technology Institute of University of Wisconsin-Madison, 26 pages.

G.L. Kulcinski et al., "Demonstration of D3He Fusion in an Inertial Electrostatic Confinement Device—Progress Report Jan. 1, 2000 through Dec. 6, 2000," Dec. 6, 2000, Fusion Technology Institute of University of Wisconsin-Madison, 16 pages.

R.P. Ashley et al., "D3-He Fusion in an Inertial Electrostatic Confinement Device," 1999, Fusion Technology Institute, 3 pages.

Robert W. Bussard, "Some Physics Considerations of Magnetic Inertial-Electrostatic Confinement: A New Concept for Spherical Converging-Flow Fusion," Mar. 1991, Fusion Technology vol. 19, pp. 273-293.

Nicholas A. Krall, "The Polywell: A Spherically Convergent Ion Focus Concept," Aug. 1992, Fusion Technology vol. 22, pp. 42-49.

G.L. Kulcinski, "3He Fusion: A Safe, Clean and Economical Energy Source for Future Generations," Mar. 29, 1996, NEEP 602 Lecture 27, 30 pages.

Gerald L. Kulcinski, Helium-3 Fusion Reactors—A Clean and Safe Source of Energy in the $21^{st}$ Century, Apr. 13-16, 1993, $9^{th}$ National Space Symposium, 25 pages.

G.L. Kulcinski, "The Commercial Potential of D-He3 Fusion Reactors," Oct. 1987, $12^{th}$ Symposium on Fusion Engineering, 5 pages.

Wilson Greatbatch et al., Helium 3 Fusion: A Safe and Plentiful Fuel for the $21^{st}$ Century, Nov. 1993, Greatbatch Gen. Aid Ltd., pp. 1-4.

Wikipedia, "Inertial Electrostatic Confinement," Jan. 23, 2007, 2 pages.

A. Edwards, "Fun with fusion: Freshman fusion reactor has USU physics faculty in awe," desertnews.com, Sep. 16, 2003, 5 pages.

Wikipedia, "Fusion Power," Feb. 18, 2007, 14 pages.

G. Piefer, "Performance of a Low-Pressure, Helicon Driven IEC 3He Fusion Device," University of Wisconsin-Madison, 2006, 174 pages.

Ashley et al., "Steady-State D-3He Proton Production in an IEC Fusion Device," Fusion Technology Institute University of Wisconsin, Oct. 2000, 7 pages.

* cited by examiner

$^3$HE FUSION DEVICE WITH DIRECT ELECTRICAL CONVERSION

CROSS-REFERENCE TO RELATED APPLICATIONS

This application is a divisional of U.S. patent application Ser. No. 10/150,894, filed on May 17, 2002 now abandoned, which claims the benefit under 35 U.S.C. 119(e) of U.S. Provisional Application Ser. No. 60/292,109, filed on May 18, 2001, entitled "$^3$He Reactor With Direct Electrical Conversion."

BACKGROUND OF THE INVENTION

1. Field of the Invention

The present invention relates to electrical current generation from nuclear fusion. More particularly, the invention concerns improvements in a Helium-3 ($^3$He) fusion device, and particularly a ($^3$He—$^3$He) fusion device with electrostatic reaction confinement.

2. Description of Prior Art

By the year 2050 AD, the Earth may have run out of all economically recoverable fossil fuels, such as oil and natural gas. There should still be plenty of coal, but only if mankind is willing to put up with its associated greenhouse gasses. Also, there may be no place to put the toxic residues of present nuclear fission reactors. West Valley N.Y. doesn't want them and neither does Nevada. Worse yet, in 2050 AD all the alternate sources of energy, like hydroelectric, wind, wood, tidal, geothermal and solar, will not supply even 25% of the energy mankind will need to feed the 10 billion people that will populate Earth by that time.

Present day nuclear fission reactors operate like a slow atomic ("A") bomb, splitting heavy plutonium or uranium atoms into smaller elements and giving off power. American and Russian nuclear engineers and physicists have succeeded in slowing down the fission reaction to produce useful power, as exemplified by Three-Mile Island and Chernobyl, (a mixed blessing!). Others have accomplished this more successfully. France generates a significant part of its energy requirements from fission reactors and has achieved a perfect safety record. Their reactors are all of the same design and are run by nuclear engineers. In the U.S., the reactors are built differently and their operation is left mostly to technicians. But France still has the same problem that the U.S. has in regard to the disposal of the toxic residues.

Mankind may have no alternative but to develop the ability to harness useful energy from nuclear fusion. To date, however, it has not been feasible to produce a controlled, sustainable nuclear fusion reaction, at least not to the point of producing useful power. Nuclear fusion devices must operate like a slow hydrogen ("H") bomb, fusing light weight atoms such as hydrogen or helium.

Present nuclear fusion devices are classified by the methods used to support the nuclear fusion reaction, which takes place at a temperature much hotter than the surface of the Sun. No container on Earth can hold it. The reaction must therefore be suspended by either electromagnetic, gravitational (inertial) or electrostatic fields.

A fusion device known as the "TOKAMAK" at Princeton, N.J. operates by magnetic confinement in a huge 250 ton supercooled electromagnet. The electromagnet exquisitely controls and shapes a magnetic field, which physically supports the reaction. As far as known, the TOKAMAK device has never operated longer than a few seconds at a time and the federal government has withdrawn its support.

With inertial confinement, hundreds of powerful lasers are pointed concentrically at a gold capsule containing a small amount of hydrogen. The pressure and the temperature of the capsule are raised to fusion levels and produce a burst of energy. This process must then be repeated, perhaps 100 times per second, to provide a reasonably continuous flow of power. Two such devices exist in the USA, one in Rochester, N.Y. and one in Livermore, Calif. As far as known, neither has ever approached "break-even" in power generation.

U.S. Pat. No. 4,826,646 of Bussard, the contents of which are incorporated herein by this reference, discloses a fusion device using electrostatic confinement of the reaction. The fusion reaction is confined by electrostatic forces in a large potential well within a vacuum chamber. The potential well is created by confining electrons using a quasi-spherical-cusp magnetic field to form a highly negatively charged virtual anode. Positive ions, such as Deuterium (D), Tritium (T), and/or $^3$He are introduced into the vacuum chamber and pulled into the well, where they have an opportunity to fuse according to fusion reactions involving D-T, D-D, and D-$^3$He.

Dr. Gerald Kulcinski and co-investigators at the Fusion Technology Institute at the University of Wisconsin/Madison are seeking to demonstrate nuclear fusion energy using inertial electrostatic confinement (IEC) and combinations of $^3$He and D ion starting materials. The fusion reaction is confined in a 1000 pound cylindrical aluminum vacuum chamber. This chamber has an inner diameter of 91 cm and an inner height of 65 cm. It contains a pair of concentric, tungsten alloy spherical grids with a very strong electrostatic field inside them. The outer grid is 45 cm in diameter and is grounded. The inner grid is 10 cm in diameter and is connected to a large negative potential via a ceramic insulated electrode that feeds through a small opening in the vacuum chamber. When positive ions (e.g., $^3$He or D ions) are introduced into the vacuum chamber, they fall into the potential well created by the electrostatic field within the grids and oscillate backwards and forward at increasing speed until two ions collide, fusing into a $^4$He ion and releasing high energy protons.

This device has been used to successfully demonstrate D-$^3$He and D-D fusion with significant high-velocity proton generation at 40 kV acceleration voltages across the two grids. Although these are significant achievements, no provision has been made to recover useful energy from the device in excess of the input power required to sustain the reactions. Moreover, as far as known, the foregoing device has produced no successful reaction based on the fusion of two $^3$He ions into one $^4$He ion with the release of a stream of high velocity protons in the 1 to 10 MeV range. To achieve $^3$He—$^3$He fusion will require a 200 kV grid voltage. However, the investigators at the Fusion Technology Institute have not been able to use voltages over 80 kV because of arcing between the ceramic insulated electrode and the vacuum chamber. A fusion reaction using $^3$He alone would be desirable because the fuel (He-3) is non-radioactive, the process is non-radioactive, and the residue (He-4) is non-radioactive. In fact, the residue, He-4, is used to inflate childrens' balloons. Thus, He-3 may be the perfect fuel for fusion-based nuclear reactions. On the other hand, the D-$^3$He and D-D fusion reaction generates a steady stream of neutrons, protons, electrons, helium-4 (He-4), tritium, gamma and x-rays.

Accordingly, improvements are indicated in the construction and implementation of fusion devices.

SUMMARY OF THE INVENTION

A fusion device that is especially adapted for $^3$He reactions (particularly $^3$He—$^3$He reactions) includes two concentric high-voltage spherical grids, preferably of a tungsten alloy. Both grids are positioned in a vacuum chamber that is relatively large in size (e.g., at least about 3 ft. in diameter). The outer grid is grounded and the inner grid can be held at a high negative DC voltage, such as −200,000 volts. The high voltage ceramic insulated electrode that feeds through the vacuum chamber outer wall of the prior art IEC fusion device is also replaced with a wide spaced hermetic feed-through insulator, which depends on air separation rather than ceramic insulation so as to provide a long air leakage path sufficient to suppress any sparking.

For an $^3$He—$^3$He reaction, the grids are maintained in a $^3$He ion environment within the vacuum chamber at a pressure of about one Torr (1 mm Hg). Positive $^3$He ions are attracted to the grounded outer grid and move toward it. As each $^3$He ion approaches the outer grid, it passes through the grid and comes under the attraction of the high negative voltage of the inner grid. The $^3$He ion accelerates across the inner grid and passes though the opposite wall at high (but not relativistic) speed. It then comes under the influence of the grounded outer grid, decelerates, turns around and progresses back through both grids. This oscillatory motion continues until finally one $^3$He ion going across the grids collides with a similar ion returning from the other side. The collision results in a nuclear reaction whereby the two neutrons in the two $^3$He ions combine into a He-4 ion.

Two protons from one of the $^3$He ions joins the He-4 ion, completing it, and the other two protons for the other $^3$He ion come off at relativistic speeds, and fly out through both grids. Traveling at a sizable fraction of the speed of light (relativistic speeds), they have very large energies in a band ranging from 1 to 10 MeV, with a peak at about 5 MeV.

These protons would normally impact the outer case of the vacuum chamber enclosure, creating heat, which could be used to form steam, but the device would then represent a heat engine, subject to the classic 40% maximum efficiency of all heat engines. Instead, another embodiment of the invention is proposed for use in a fusion device having a potential well formed by either a spherical grid anode or a virtual anode according to the Bussard patent described above. According to this embodiment of the invention, one or more concentric spherical cages (with optional proton diverters) are added outside the potential well of the device to slow down the speeding protons, collect them, and produce an electrical output. A voltage divider arrangement can be used to obtain a desired electrical output. In a further alternative embodiment, a magnetron coverts proton energy directly into microwave energy.

DETAILED DESCRIPTION OF PREFERRED EMBODIMENTS

As summarized above, a basic device according to the invention consists of a vacuum chamber enclosure containing two concentric spheres made of tungsten wire grid material and carrying a voltage differential of 200 kV for a $^3$He—$^3$He fusion reaction, with the inner grid being negative. The tungsten wires are quite fine (0.8 mm in diameter) compared to the separation between the wires to insure good transparency to the proton stream output. The vacuum is a "soft" vacuum of about 0.1 to 1.0 Torr of $^3$He. This is about the atmospheric pressure seen at 100 km altitude above sea level. This means that at this altitude, and above, a vacuum chamber should not be needed, for example in a nuclear rocket engine.

For a $^3$He—$^3$He fusion reaction, positive $^3$He ions are injected into the area near the grounded outer grid. Each $^3$He ion slides down the potential hill and passes through the outer grid, falls under the influence of the negative inner grid (−200 kV), where it picks up speed until it passes through the inner grid. The $^3$He ion will have then achieved maximum velocity (prior to fusion) and will continue through the center of the inner grid at the same velocity, pass through the far side of the inner grid, and enter the influence of the far side of the outer grid, which is at ground potential. The $^3$He ion slows, stops, and then reverses and goes back through both grids in an oscillating pattern. Eventually the $^3$He ion will meet another $^3$He ion traveling in the opposite direction and collide with it. The collision will result in a $^4$He ion, and two fusion protons. The major portion of the energy will be in the two 5 MeV protons, but the fusion is a three-body reaction which produces a spread of energies between 1 MeV and 10 MeV, with a broad peak at about 5 MeV. The energy is $\frac{1}{2} mv^2$. The proton has a single charge, so the velocity is very high, about a tenth of the speed of light. The proton travels out through both grids and, if unimpeded, impacts on the case of the vacuum enclosure, giving up its energy in the form of heat. One could potentially put some coils of tubing in the vacuum chamber outer shell and generate steam as the power output of the device, but this would then be a heat engine and would be subject to the usual Carnot Cycle efficiency limit of all heat engines of about 40%. While such a nuclear fusion device would still be a great breakthrough, it is preferable to find some way of direct electrical conversion of the proton stream into an electron current, to avoid the limitations of the Carnot Cycle.

The output energy is in the form of a stream of high-velocity protons. To recover this energy, two things must be done. First, the proton stream must be slowed down, or stopped, to recover the momentum energy. Second, the proton stream must be converted into an electron current. Both objects can be accomplished by inserting an additional positively charged wire cage well outside the grounded high-voltage grid. If this cage is charged to +5 MV, it will slow down 5 MeV protons to a stop and permit them to drift over to the nearest wire of the cage and discharge. Neutralizing some of these protons by inserting electrons from an outside source (a very high resistor to ground) will produce an electron current at the 5 MV voltage level. Reduction of this voltage to a 1 MV level will permit direct connection to high-voltage DC transmission lines.

Because the stream of protons has a spread of energies all the way from 1 MeV through 10 MeV, use of a number of tungsten wire cages, as many as ten (or more), and respectively charged with 1, 2, 3, 4 - - - to 10 MV, is proposed. This will produce ten energy sources at various levels of voltage, each requiring a separate voltage reduction scheme to arrive at the 1 MV level of the transmission lines.

These voltage reduction elements may further include a device for periodically reversing the polarity of the DC current 60 times per second so as to permit the production of conventional AC power for the National Grid. However, waveform modification to go to a sinusoidal wave will probably be necessary.

The presence of a 10 MV voltage level on one of the cages raises some interesting problems. At sea-level 5000 volts will jump across a distance of 0.25 inches (more or less, depending on the shape of the electrodes). Thus, 200 kV will jump an arc of 10 inches, 1 MV will jump an arc of 50 inches, and 10 MV will jump an arc of 500 inches, or more than 40 ft. Fortunately, the arcing voltage limits are much higher at 100 km of altitude. As one goes up from sea level, the voltage necessary to jump one inch, halves in Quito, Ecuador, but then gradually approaches an inversion point at about 30,000 ft. of altitude. From then on it increases more or less linearly with the reciprocal of pressure. Thus, allowing a generous safety factor, a safe spacing of the 10 MV cage from its low voltage neighbors and from the grounded grid, might be as low as 15 ft. in the vacuum of space (or within a vacuum chamber). However, a ground-based device operating at sea level atmospheric pressure might well require a 100 ft. diameter high-vacuum chamber enclosure (providing a 50 foot spacing around the 10 MV cage).

The presence of so many spherical cages might give some concern about loss of transparency to the proton stream. In such a case, one may employ diversion of the proton stream slightly away from each wire, but still keeping it within the slowing influence of the wire. In post WW II vacuum tube technology, power pentodes were displaced from some of their market share by the advent of the 6L6 "beam" tetrode. This tube dispensed with the normal suppresser grid and substituted a "beam-forming" extension of the grid, which diverted the electron beam slightly to one side and counteracted the space-charge, but without the detrimental effect of the suppresser grid which it replaced. A similar technique is used here, whereby an extra diverter grid wire is placed in front of each collector wire (and given a charge slightly more positive than that on the collector wire. This would divert the proton stream slightly aside to avoid hitting the wire. However the protons destined to strike the wire would still be slowed to a stop but would circle around the wire before landing on it. The faster portions of the proton stream will travel right through, unencumbered, with but a slight bend in their path around the collector wire rather than hitting it. Thus transparency can be improved.

First Embodiment

Improvements in Conventional Electrostatic Fusion Device Design

Figures 1, 1A:
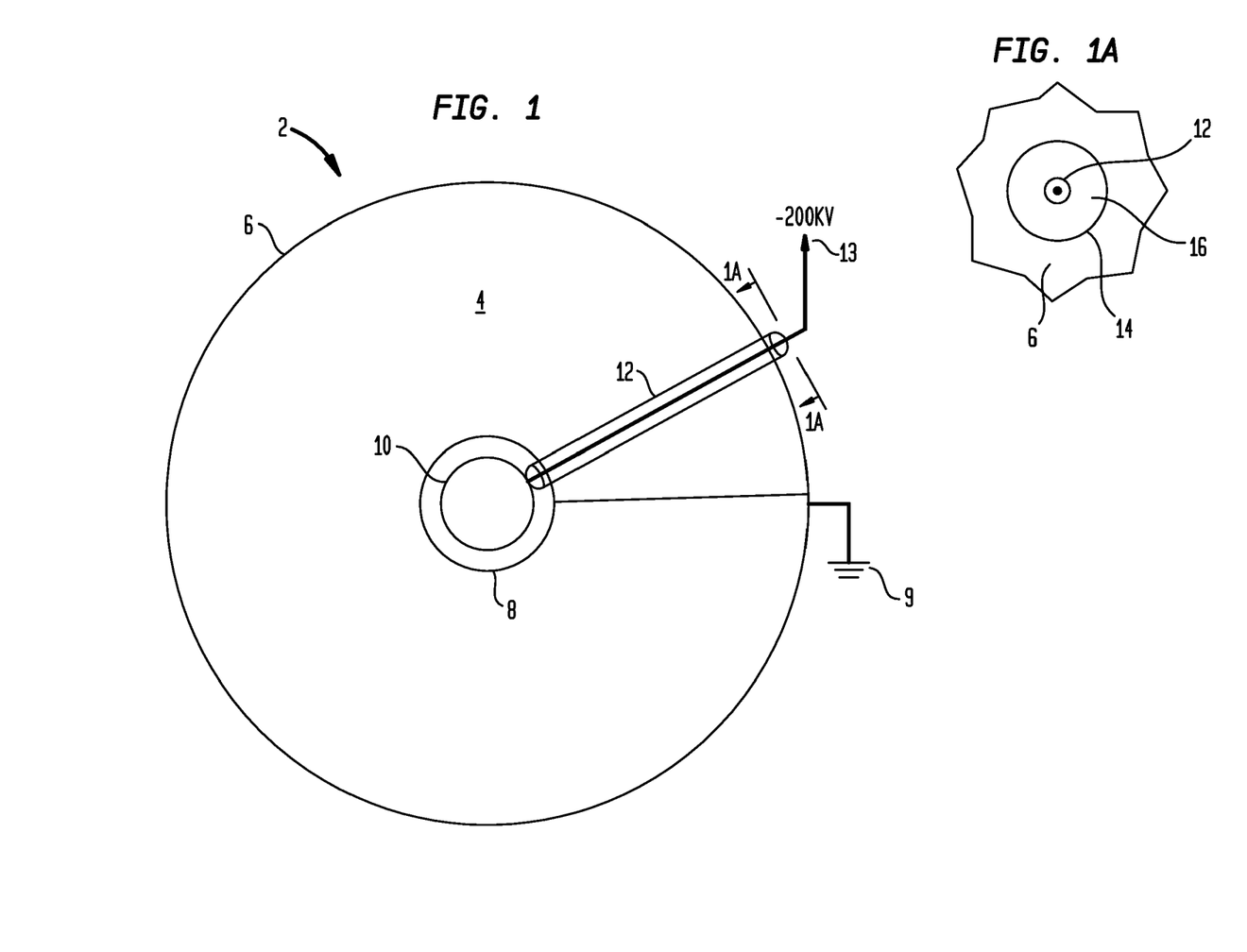
FIG. 1 shows an electrostatic fusion device with an outer high-voltage grid at ground potential, and an inner high-voltage grid that can be held at −200 kV for $^3$He—$^3$He fusion reactions.
FIG. 1A is a view taken substantially in the direction of line A-A in FIG. 1.

Based on the voltage-pressure dependent electrical arcing characteristics discussed above, the first inventive embodiment calls for a relatively large device (e.g., a vacuum chamber diameter of at least about 3 ft.), and a feed electrode passing through the vacuum chamber with a large space gap so as to provide a long air leakage path sufficient to suppress any sparking when carrying high voltages (e.g., −200 kV). In particular, as shown in FIGS. 1 and 1A, the $^3$He fusion device (2) includes a vacuum chamber (4) having a cylindrical outer shell (6) (other shapes could be used). The vacuum chamber (4) contains a spherical outer grid (8) that is connected to ground potential (9) and a spherical inner grid (10) that is connected via a shielded electrode (12) to a voltage source (13) capable of producing −200 kV. The electrode is fed through a large opening (14) in the vacuum chamber outer shell (6). This opening is preferably large enough to provide an air gap of at least about 10 inches between the electrode (12) and the outer shell. This is the air gap required at sea level to prevent arcing of the −200 kV electrode as it enters the vacuum chamber at full atmospheric pressure. The gap between the opening in the vacuum chamber outer shell and the −200 kV electrode is hermetically sealed with a suitable material, such as an acrylic spacer (14).

To initiate a $^3$He—$^3$He fusion reaction, the inner grid (10) is charged to −200 kV and $^3$He ions (+) are dropped into the outermost space between the grounded outer grid (8) and the outer shell (6) of the vacuum chamber (4). Each $^3$He ion drifts toward the center and passes through the grounded grid (8). The ion then comes under the influence of the −200 kV inner grid (10) and accelerates, achieving maximum speed (not relativistic) as it passes through the −200 kV grid. The $^3$He ion then proceeds at constant speed across the inner grid (10) until it passes through the interior of this grid.

The $^3$He ion then decelerates under the influence of the far side of the outer (grounded) grid (8) until it stops, reverses and travels back towards where it came from. The $^3$He ion again accelerates, decelerates and oscillates back and forth. Eventually, the ion in returning will strike another ion coming across. The collision will generate a nuclear fusion reaction, generating a $^4$He ion and two relativistic protons.

A neutron from each $^3$He will form the two neutrons of the $^4$He ion. Two protons from one $^3$He ion will complete the $^4$He ion. The remaining two protons will come off the remaining $^3$He ion at relativistic speed and will randomly race through any grid (if unimpeded) and impact the outer shell (6) of the vacuum chamber (4), producing heat. This heat could be used to produce steam, but energy production efficiency would be limited by the limitation of the Carnot cycle efficiency to about 40%.

Second Embodiment

Direct Electrical Conversion with Multiple Spherical Cages

Figure 2:
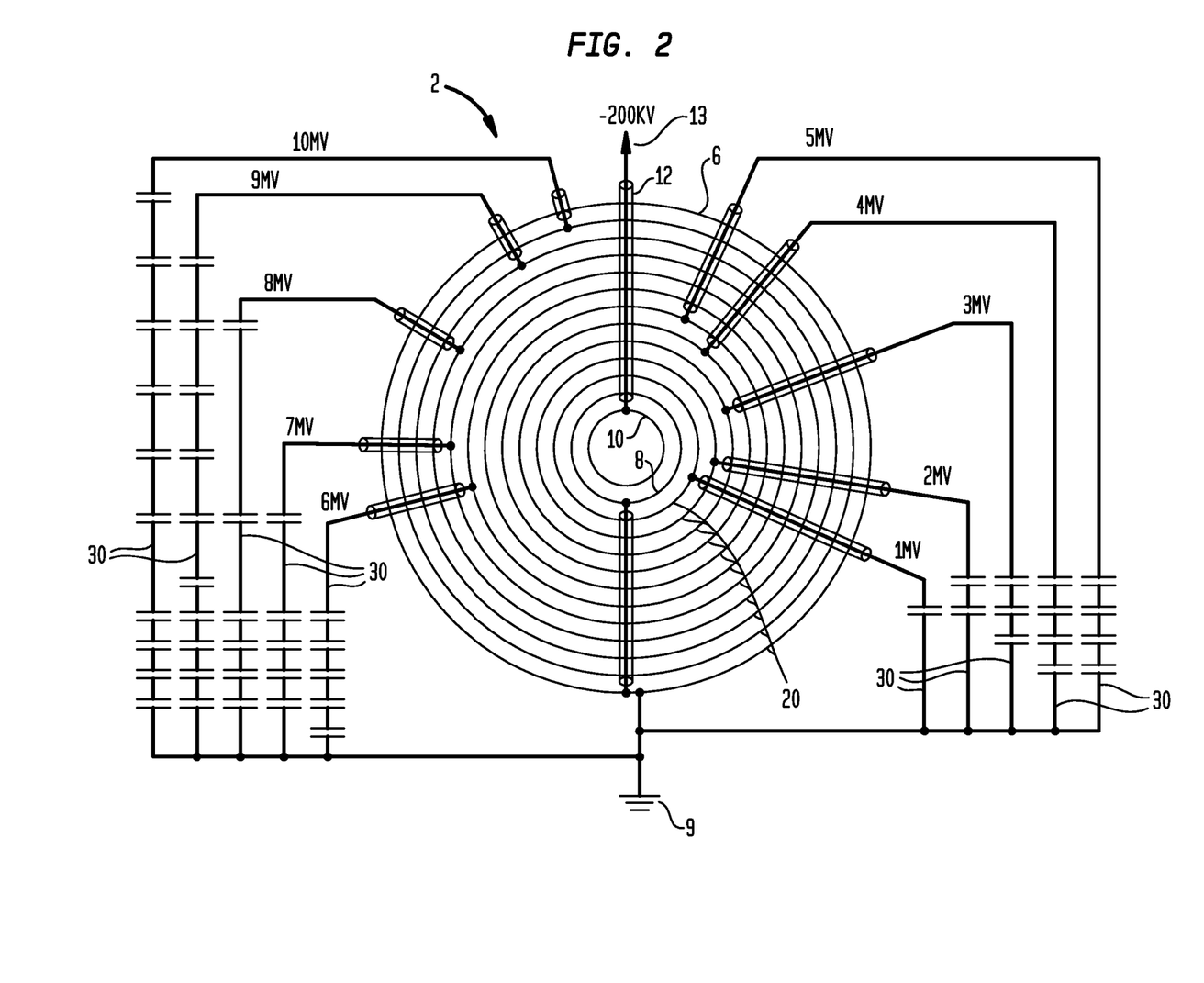
FIG. 2 shows a device as in FIG. 1, but with ten collector cages positioned at energy levels of 1 through 10 MeV to collect protons of corresponding voltages (1 to 10 MV).

As shown in FIG. 2, one or more isolated concentric collector cages (20) are located outside of the potential well created by the high-voltage outer and inner grids (8, 10) of FIG. 1. Although not shown, the collector cages (20) could be similarly located outside the potential well formed by a virtual anode in a fusion device constructed according to the Bussard patent described above.

Each cage (20) attracts protons until the potential at the cage (20) equals that of the immediately surrounding space. Protons that are near the potential of a cage (20) will impact on the cage. If a small stream of electrons is now supplied to the cage (20) (not sufficient to significantly change the cage potential) an electron current, at the cage potential, will be obtained. Thus, the energy contained in the relativistic speed of the protons will be given up and transformed into a small electron current but at MV levels. Insofar as each proton has a unit charge, each proton with an energy of "n" MeV will have an electrical potential of "n" MV. The collector cages (20) will thus provide direct electrical conversion, circumventing the Carnot cycle efficiency of all heat engines. If ten such isolated cages (20) are located beyond the high-voltage grids (8, 10), then ten electron currents can be obtained at 1, 2, 3, 4 - - - 7, 8, 9, 10 MV voltage levels. Now, if capacitor banks (30) are placed across each collector cage (20), to ground (9), and if each capacitor bank (30) comprises multiple series elements, the series-charged capacitors representing each capacitor bank (30) can discharge in parallel, resulting in a voltage divider. Each collector cage (20) will then have its voltage level (DC) transformed down to a common 1 MV level for cross-country power transport. Also, if the discharges are simultaneous, and the polarity of each discharge is sequentially reversed, 60 times per second, the output will be AC.

FIG. 2 shows that there may be as many as ten collector cages (20), distributed across the distance from the outer grounded grid to the vacuum chamber outer shell. The energy of the fusion protons will be distributed over a range of 1 to 10 MeV. As indicated above, given that the protons are particles having a unit charge, the voltage distribution of these particles (due to the varying speeds of the relativistic protons, will vary between 1 MV and 10 MV. Thus, a 5 MeV proton will tear randomly through both of the high-voltage grids (8, 10) without slowing appreciably, and if brought to rest half way out the voltage gradient to the outermost cage (20), would be at a potential of 5 MV. As many such protons accumulate at this point, they will come to rest on the isolated collector cage (20) located there, bringing the cage to an equilibrium potential of 5 MV if no current is drawn from it.

If a small number of electrons are drawn from a collector cage (20) (not enough to disturb the field potential at that pointy, useful current at 5 MV can be produced. If, at this point, a capacitor bank (30) having five 1 MV capacitors is connected in series across this cage (20) to ground, the capacitors will eventually charge to 5 MV. If the five capacitors are periodically discharged in parallel, rather than in series, the output will be 1 MV, which can be directly attached to an existing 1 MV inter-city power transmission grid.

Similarly, ten such collector cages (20), equally distributed (potential-wise) across the space between the outer (grounded) grid (8) and the vacuum chamber outer shell (6), and charging to 1, 2, 3, 4, 5, 6, 7, 8, 9 and 10 MV, can be series-connected to ground (9) across 1, 2, 3, 4, 5, 6, 7, 8, 9 and 10 1 MV capacitors, respectively, for each cage. Discharging these individual capacitors in parallel will produce a multiple 1 MV power (DC) supply.

Third Embodiment

Direct Electrical Conversion with Extra Diverter Grids

Figure 3:
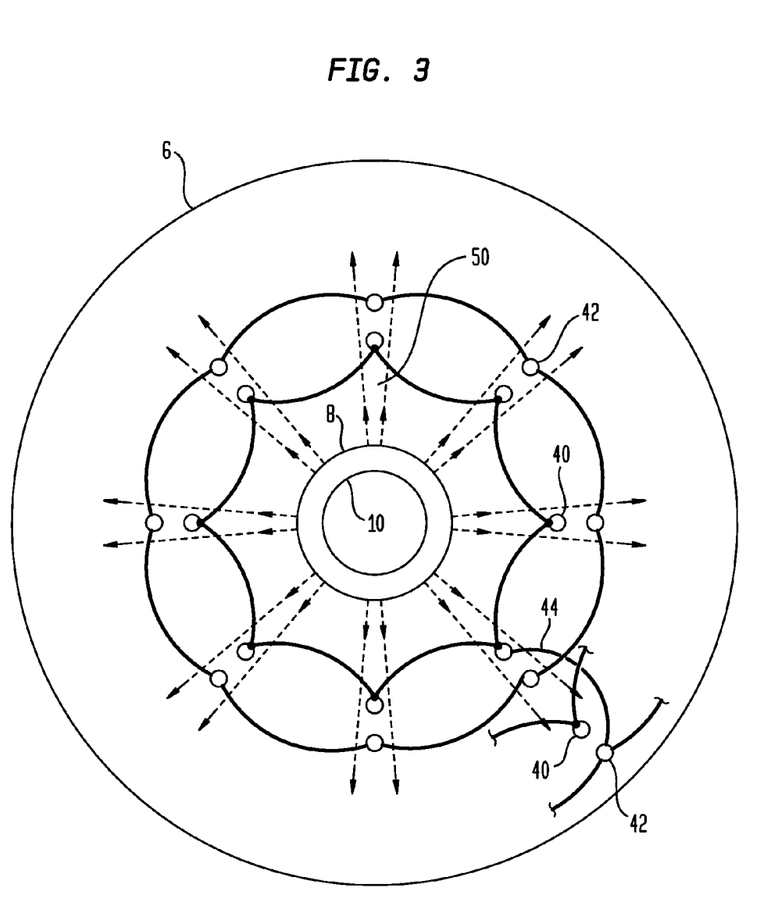
FIG. 3 shows additional diverter wires to deflect high energy proton streams away from lower voltage collector wires so as to avoid unwanted collisions.

A possible objection to the previous embodiments is that some of the relativistic protons will hit the high-voltage grids (8, 10) and the collector cages (20), thereby immediately coming to a stop and giving up their energy in heat. This problem can be minimized (1) by having the grids (8, 10) and cages (20) be a small percentage of the area traversed by the relativistic protons and (2) by positioning an extra grid diverter wire (40) in front of each collector cage wire (42), charged slightly more positive than the collector wire itself. This arrangement, which is shown in FIG. 3, will split the stream (50) of relativistic protons, sending them to each side of the collector wire (42), avoiding the impact (or minimizing it) and reducing the losses from this source. As noted above, a somewhat analogous technique was used in the old W.W. II 6L6 "beam tetrode," which shaped the emission from the cathode to avoid the space charge near the plate (anode) and eliminate the need for an extra "suppression" grid which otherwise would have been necessary.

Fourth Embodiment

Direct Electrical Conversion with Diverters Connected to Next More Positive Collector In a related embodiment, the diverter wires (40) are not separately charged, but are connected (see 44) to the next more positive collector cage wire (42). Because this system depends for its diversion on the voltage developed by the proton stream on the collector cage wires (42), it should be self-adjusting. Varied placement of the diverter wires (40) themselves would produce some control.

Fifth Embodiment

Fixing Voltage of Highest Voltage Collector Cage

In this embodiment, the collector cage (20) having the highest expected voltage (10 MV) has a fixed voltage applied to it to locate the outer voltage of the energy limit of the highest expected energy field (about 10 MeV), and thus set the distribution pattern for all the collector cage voltages.

Sixth Embodiment

Controlling Collector Cage Current

In this embodiment, the current through each collector cage (20) is controlled such as to adjust the voltage level of the cage, so that the divided voltage will be close to the desired level of 1 MV.

Seventh Embodiment

Magnetron Approach

Figure 4:
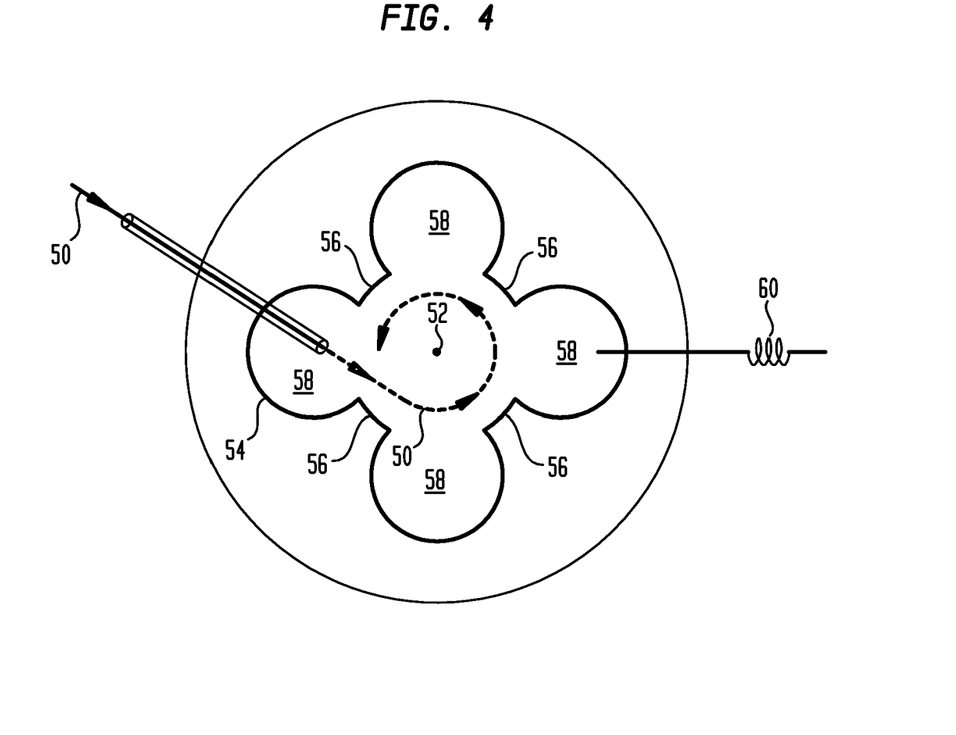
FIG. 4 shows a magnetron approach to enable transformation of the energy in the proton stream into microwave energy.

In this embodiment, shown in FIG. 4, a proton stream (50) is injected at high velocity radially into a magnetic field (52) in the open center of a magnetron cavity (54). The magnetron's magnetic field (52) bends the proton stream (50) into a circular path. As the proton stream (50) passes the cusps (56) in the magnetron structure, a voltage will be induced in each of the four magnetron cavities (58). As the proton element approaches the other side of the cavity (58), another voltage will be induced, augmenting the original voltage pulse which will arrive a fraction of a microsecond later, having had to navigate the circumference of the magnetron (54). This will happen at all four cavities (58) simultaneously. A single inductive loop (60) inserted into any cavity (58) will draw energy from the proton stream (50), thus drawing energy from all four cavities (58) simultaneously, as is done in military radar magnetrons. In this way, the energy in high-velocity proton stream (50) from the device is directly electrically converted into microwave energy, without having to go through the wasteful loss of the Carnot Cycle efficiency limit common to all heat engines.

In each of the foregoing seven embodiments, a fusion device with direct electrical conversion has been shown and described. Unlike current energy production techniques, the fusion device of the invention is not a heat engine. It generates electricity directly and is not limited by the "Carnot cycle" efficiency. More importantly, the fusion device does not generate carbon dioxide or any of the other "greenhouse" gasses. Additionally, the fuel ($^3$He) is non-radioactive. A $^3$He—$^3$He fusion reaction process produces no residual radioactivity and the residue ($^4$He) is non-radioactive. In fact, the residue, $^4$He, is used to inflate childrens' balloons. Thus, $^3$He may be the perfect fuel and a $^3$He—$^3$He reaction may be the perfect reaction process.

However, there are a couple of caveats. The first is that the reaction takes place at a temperature much hotter than the surface of the Sun. The other is that there is practically no $^3$He on Earth. More particularly, there is a tiny bit of $^3$He deep in the Earth, from when the Earth was first formed. It comes up to the Earth's surface as a tiny percentage of natural gas. There is also a small additional supply of He-3 in old nuclear bombs in the form of radioactive tritium gas ($^3$H), which decays into, of all things, $^3$He in about 13 years (half-life).

Substantially more $^3$He comes from the Sun in an ionized form on the solar wind. The ions hit the Earth's magnetic field and get diverted away. Because the ions cannot land on Earth, they drift around and eventually land on the Moon. They have been landing there for four billion years. It is estimated that there is more $^3$He energy on the Moon than mankind has ever had in the form of fossil fuels on Earth.

$^3$He on the Moon is contained in an ore called ilmenite (iron titanate), which contains titanium dioxide. $^3$He comes adsorbed on the titanium dioxide. The ilmenite must be scraped off the Moon surface and refined to obtain the titanium dioxide. The recovered titanium dioxide may then be placed under a large transparent plastic hood and held there two weeks, until the Moon rotates around towards the Sun. It will become very hot under the hood and boil off the $^3$He. Then the process needs to wait two weeks until the Moon rotates around away from the Sun. This will result in very cold temperatures under the hood, which should go a long way toward liquefying the $^3$He. It is estimated that a single shuttle load (25 tons) of $^3$He brought back from the Moon would supply all of the energy needs of the USA for a year.

The cost of the $^3$He, including the shuttle, the Moon colony, and the ilmenite refinery, amortized over a suitable number of decades, has been calculated to be an equivalent oil cost of about $8 per equivalent barrel of oil. The current price for a barrel of oil is about $22 (in early 2000 AD). The generation of $^3$He fusion power is thus not only technically feasible, it is economically feasible. In fact, in the opinion of applicant, it is inevitable.

Accordingly, fusion device has been disclosed with provision for direct electric conversion of a relativistic proton stream into electric current at a voltage level of one million V DC. While various embodiments of the invention have been shown and described, it should be apparent that many variations and alternative embodiments could be implemented in accordance with the invention. For example, although $^3$He—$^3$He reactions have been discussed in the foregoing detailed description, it will be appreciated that other fusion reactions using $^3$He and other materials, such as Deuterium, could be implemented. Non-$^3$He fusion reactions, such as D-D, may also be possible. It is understood, therefore, that the invention is not to be in any way limited except in accordance with the spirit of the appended claims and their equivalents.

I claim:

1. An electrostatic fusion device, comprising:
    a vacuum chamber;
    a potential well disposed in said vacuum chamber;
    a partial vacuum environment in said vacuum chamber containing fusion reaction ions;
    plural concentrically arranged collector cages surrounding said potential well, said collector cages being generally spherical in shape and of progressively increasing size from an innermost collector cage to an outermost collector cage and having progressively increasing voltage levels from said innermost collector cage to said outermost collector cage, said voltage levels corresponding to energy levels of protons emitted from a fusion reaction occurring within said potential well, and being connected to deliver an electrical current output at said collector cage voltage levels;
    plural electron source pathways respectively connected to said collector cages to deliver said electrical current output;
    a diverter wire associated with each of said collector cages;
    each diverter wire being of higher potential than its associated collector cage and being adjacent thereto at a location that is between said associated collector cage and said potential well;
    plural voltage sources respectively connected to said diverter wires, said voltage sources being of progressively increasing voltage from an innermost diverter wire to an outermost diverter wire and each being of higher potential than said collector cage associated with said diverter wire to which said voltage source is connected.

2. A fusion device according to claim 1 wherein said collector cages are series-connected to ground potential through corresponding charge storage devices.

3. A fusion device according to claim 2 wherein there are ten collector cages respectively maintained at voltage levels ranging from 1 MV to 10 MV in 1 MV increments, with a 1 MV collector cage being the innermost one of said collector cages and a 10 MV collector cage being the outermost one of said collector cages.

4. A fusion device according to claim 3 wherein each collector cage is series-connected to ground potential through a bank of "n" 1 MV-rated capacitors, where "n" is the MV potential of the collector cage.

5. A fusion device according to claim 4 wherein each said bank of capacitors associated with one of said collector cages is parallel-connected to banks of said capacitors associated with other of said collector cages.

6. A fusion device according to claim 1 wherein each diverter wire adjacent to a collector cage is connected to an adjacent collector cage of higher potential than the collector cage to which said diverter wire is adjacently located.

7. A fusion device according to claim 6 wherein there are several collector cages of different voltage, with the outermost collector cage having the highest voltage and being connected to a voltage potential source for fixing the voltage of said outermost collector cage.

8. A fusion device according to claim 7 wherein collector cage voltage levels are adjusted by controlling electrical current through said collector cages.

9. A fusion device according to claim 8 wherein said reaction ions are 3He ions and said fusion reaction is a 3He-3He reaction.

* * * * *